United States Patent Office 3,088,804
Patented May 7, 1963

3,088,804
PROCESS FOR MAKING DIBORANE AND HIGHER BORON HYDRIDES
Alan L. McClelland, Wilmington, Del., assignor to E. I. du Pont de Nemours and Company, Wilmington, Del., a corporation of Delaware
No Drawing. Filed Nov. 13, 1958, Ser. No. 773,550
14 Claims. (Cl. 23—204)

This invention relates to boron hydrides and more particularly to a new and improved method for making diborane and higher boron hydrides.

This application is a continuation-in-part of my copending U.S. application Serial No. 649,642, filed April 1, 1957, now abandoned.

Diborane, a basic chemical in boron chemistry, is useful in a wide variety of applications. Many boron compounds of importance can be directly obtained from it. Diborane can be pyrolyzed under controlled conditions to form boron or boride coatings on metals or ceramics. Diborane and higher boron hydrides are useful as high energy fuels.

Several methods for preparing diborane and other boron hydrides have been disclosed heretofore. However, these older methods possess certain deficiencies. Some, for example, give poor yields of diborane, others require the use of expensive or relatively unavailable starting materials, and still others yield diborane contaminated with appreciable amounts of hydrocarbon, hydrogen chloride and other impurities which are difficult to remove. Recently several new methods of making diborane have been proposed which use boron halide starting materials.

In view of the potential importance of diborane and the above-mentioned deficiencies of the older preparative methods, this invention has as an object a more economical preparation of diborane and one more suitable for use in large scale manufacture of diborane and higher boron hydrides. A further object is provision of a novel method for preparing diborane and higher boron hydrides from the lowest cost and most readily available boron compounds that are known. Still another object is provision of a novel method for preparing diborane which is not contaminated with difficultly removable by-products.

These objects are accomplished in accordance with the present invention by a process which comprises reacting, at a temperature of from 100° to 800° C., a member of the group consisting of boric oxide, boric acid, and metal borates with hydrogen, aluminum, and an aluminum halide in which the halogen has an atomic number of at least 17, i.e., the halogen is chlorine, bromine, or iodine.

As indicated above, boric acid and metal borates are operable in the process of this invention as well as boric oxide. The borates of the alkali metals and alkaline earth metals are particularly well suited for use in the process because of their availability. Specific borates that can be employed include lithium, sodium, potassium, calcium, magnesium, and barium metaborates, and calcium, sodium and potassium tetraborates. Hydrated borates are operable but are not preferred because they lead to a loss of aluminum through reaction with the aluminum halide.

The aluminum need not be added as such. Any metal which is more electropositive than aluminum can be introduced in place of aluminum in this process since such a metal will react with the aluminum halide to liberate aluminum which can then enter into the reaction. Specific examples of such metals are the metals of groups I-A and II-A of the periodic table (the table given in Deming's "General Chemistry," 5th ed. (1944), John Wiley & Sons, Inc.) having an atomic number of 11–20, inclusive, i.e., sodium, potassium, magnesium and calcium.

It is preferred to use a mixture of an aluminum halide and another metal halide, especially mixtures in which the other metal halide is an alkali or alkaline earth metal halide in which the halogen has an atomic number of at least 17, i.e., is chlorine, bromine or iodine, in order to reduce the tendency of the aluminum halide to sublime. Still more preferred are the aluminum halide—other metal halide mixtures which are molten at the operating temperature. Specific mixtures of such halides that can be used include mixtures of aluminum chloride, bromide or iodide with one or more of the chloride, bromide or iodide salts of lithium, sodium, potassium, calcium, or magnesium. Mixtures of these halides containing at least 50 mole percent of aluminum trihalide are particularly preferred as they are lower melting than mixtures containing lower proportions of aluminum trihalide.

Even though it is preferred to carry out the process of this invention under conditions such that the aluminum halide or mixture of aluminum halide with another metal halide is molten, this is not essential. Diborane and higher boron hydrides are produced by reaction of boric oxide, boric acid or a metal borate with hydrogen, aluminum, and a solid or gaseous aluminum halide or aluminum halide-metal halide mixture.

In an optional embodiment of the process of this invention the reaction of the boric oxide, boric acid or metal borate with hydrogen, aluminum and the aluminum halide is carried out in the presence of a hydrocarbon that is free from aliphatic unsaturation, i.e., an aliphatic, cycloaliphatic, or aromatic hydrocarbon. The amount of such hydrocarbon reaction medium used is not critical, any amount providing a fluid reaction medium being satisfactory. In this embodiment, the process is carried out at a temperature above 130° C. and preferably in the range of 200°–400° C. under a hydrogen pressure of at least 1 atmosphere. Specific hydrocarbons that are useful in this embodiment include benzene, toluene, xylene, pentane, octane, cyclohexane, and the like.

The reactants used in this process can be of the ordinary grades of materials available commercially. The hydrogen should be oxygen-free. The particle size of the solid reactants is not critical. However, granular or powdered reactants are preferred since more rapid and intimate mixture of the reactants can be obtained with finely divided materials, and more rapid reaction can be obtained in solid-gas reactions when the solid reactants have as large a surface area as possible.

While the proportions of reactants employed are not highly critical, it is advantageous that the mole ratio of aluminum halide to boric oxide (or boric acid or metal borate) be at least 1 since such ratios give better conversion of the boron compound to the desired boron hydrides. In the overall reaction, it is preferred that at least 3 moles of hydrogen, 2 gram atoms of aluminum and 1 mole of aluminum halide be used for each mole of boric oxide (and proportional amounts of these reactants based on the boron content of the other boron starting materials). In some operating conditions, for example, in reactions carried out under high hydrogen pressure in a continuous system, the boric oxide or other boron starting material can be present in a large excess.

In some cases it is desirable to include in the reaction system a catalyst, although this is not essentially for the operability of the process. Iodine, methyl iodide, or mixtures of these in any proportions can be used as catalysts. The amount of such catalysts can range up to 2% of the total weight of the reactants.

Reaction temperatures of 100° to 800° C. are operable in the process of this invention. The particular temperature employed in any individual case is dependent on the particular metal halide and particular type of equipment being employed. The combination of temperature and metal halide selected should preferably be such as to provide a molten reaction mixture. Temperatures above 150° C. are generally preferred.

Temperatures above 300° C. are particularly suited for carrying out the reaction by a continuous process since this type of process is capable of providing short contact times of the reactants and reaction products at the operating temperature. When operating temperatures of 300° C. and higher are being used, it is important that the reaction product be removed from the reaction zone and cooled rapidly in order to minimize degradation of the diborane. For this reason, it is preferred to cool the reaction gases to a temperature below 300° C. in less than one minute, and preferably in less than 30 seconds. When the process is carried out at temperatures of 100° to 250° C. reaction times of 0.5 hour to 5 hours generally are useful.

The process of this invention can be carried out under a wide range of operating pressures. Pressures ranging from about 0.5 atmosphere up to 3000 atmospheres or more are operable. The only upper limit on pressure is the strength of equipment available for carrying out the reaction. The higher pressures in the range mentioned above, e.g. pressures exceeding about 500 atmospheres, are generally used with the lower operating temperatures, e.g., at temperatures below about 300° C. in order to obtain good conversion rates.

The reactor is charged with the solid ingredients, i.e., the boric oxide (or boric acid or metal borate), the aluminum metal and the aluminum halide or aluminum halide-metal halide mixture, and the catalyst, if one is used, and is then closed and evacuated. If the reactor is to be agitated, it is often convenient to include in the reaction vessel a mixing aid, e.g., stainless steel balls. Hydrogen is then introduced into the reaction vessel to provide the desired pressure at the reaction temperature and the vessel is heated to the selected operating temperature. Additional hydrogen is introduced periodically to maintain the pressure at the desired value.

After the reaction is completed, which is indicated by a cessation in the absorption of hydrogen, the reaction vessel is cooled. The end of the reaction is conveniently determined by noting when there is no further drop in pressure in the reaction vessel, provided that a reaction vessel of appropriate capacity and a pressure gauge of sufficient accuracy and sensitivity to register significant changes in pressure are employed. If the reactor has been agitated it is desirable to inject hydrogen during the cooling to remove any solid material that might be plugging the outlet. After cooling, the reaction gasses are carefully bled through traps cooled to a low temperature, e.g., by means of liquid nitrogen, to isolate condensable gaseous reaction products. The composition of the condensed gases in the cold trap can readily be determnied by means of the mass spectrometer. If desired, the diborane and higher boron hydrides condensed in the trap can be isolated by fractional distillation. Alternatively, the diborane can be recovered by passing the gaseous products through a scrubber containing an absorbent or reagent capable of removing diborane, e.g., an alcohol or an amine.

The process of this invention is illustrated in further detail by the following examples.

*Example I*

A corrosion-resistant reaction vessel made of stainless steel, having an internal volume of 400 ml., and capable of withstanding high pressures is charged with 200 g. of anhydrous aluminum trichloride, 30 g. of aluminum powder, 50 g. of sodium chloride, 19 g. of boric oxide, 0.1 g. of iodine and 0.1 g. of methyl iodide. The reaction vessel is then closed and evacuated. Hydrogen is introduced in sufficient amount to provide a pressure of 900 atmospheres at the reaction temperature of 170° C. The vessel is then heated to 170° C., for 3 hours after which the reactor is cooled back to room temperature. The reaction vessel is carefully opened and the gaseous products are bled through a trap cooled by liquid nitrogen. There is obtained 0.5 g. of condensed gaseous products which mass spectrometer analysis shows to contain diborane.

*Example II*

A reaction vessel of the type used in Example I is charged with 12.5 g. of boric oxide, 20 g. of aluminum powder, 90 g. of sodium chloride and 113 g. of aluminum trichloride (anhydrous) and 25 stainless steel balls ⅜" in diameter (to assist in the agitation of the reactants). The reaction vessel is then closed, evacuated and hydrogen is introduced until the pressure is 400 atmospheres at room temperature. The reaction vessel is then heated at 177–185° C. for 5 hours with continual agitation. Hydrogen is introduced intermittently to maintain the pressure at 660–800 atmospheres during this reaction period.

The reaction vessel is then cooled to room temperature, and during this cooling step hydrogen is introduced to remove any solid particles that might have collected in the outlet tube during the agitation of the reaction vessel. After cooling, the excess hydrogen and reaction gases are bled through a trap cooled with liquid nitrogen.

The condensed gaseous products collected in the nitrogen trap are transferred to a constant volume system for measurement of volume and gas density. There is obtained 0.0241 mole of gas having a molecular weight of 28.0. The theoretical molecular weight for diborane is 27.69. This is a conversion of 13% based on boric oxide. Analysis by mass spectrometer confirms the identity of this product as diborane. This diborane is of such high purity that it does not ignite spontaneously when vented to the atmosphere. There is also isolated 0.3% of pentaborane, $B_5H_9$.

When the process of Example II is carried out at 250° C. under a pressure of 800 atmospheres of hydrogen for 35 minutes, there is obtained a 10.3% conversion of boric oxide to diborane.

*Example III*

A 440-ml. stainless steel shaker tube is flushed with nitrogen and charged with a mixture of 6.25 g. of boric oxide, 20 g. of aluminum powder, 113 g. of anhydrous aluminum chloride, 30 g. of sodium chloride, and 10 stainless steel balls ⅜" in diameter. The aluminum chloride/sodium chloride ratio is approximately that of the eutectic mixture, 39 mole percent NaCl, which is reported to melt at 116° C. The tube is closed, evacuated, and pressured with hydrogen to 400 atmospheres at ordinary temperature. Shaking is begun, the temperature is raised to 180° C. and the pressure is increased to 730 atmospheres by addition of hydrogen. The reaction is continued for 5 hours at 180° C. and 730–775 atmospheres. After the tube is cooled to room temperature, it is bled down through a liquid nitrogen-cooled trap and the excess hydrogen is bled into a vent.

The condensable gas recovered in the cold trap amounts to 46 millimoles. It is separated into three fractions by simple distillation, and the more volatile and less volatile of these are submitted for analysis by mass spectrometer. The more volatile fraction analyzes 99–100% $B_2H_6$, 0.2–0.4% (max.) $H_2$ and possibly 0.1–0.2% $B_5H_9$, while the less volatile fraction analyzes 96–97% $B_2H_6$, 0.5–1.4% (max.) $H_2$, and 2–2.5% $B_5H_9$. Possible traces of $B_4H_{10}$ and $BCl_3$ or $HCl$ are noted in both samples, but their presence is regarded as questionable.

The diborane from this experiment is not spontaneously flammable in air, a further indication of its purity. The conversion of boric oxide to diborane is 51%.

The shaker tube containing the residual melt from the foregoing experiment is placed again in a shaking apparatus, pressured with hydrogen and run for an additional 5 hours at 180° C. and 710–765 atmospheres hydrogen pressure. Additional diborane of the same purity is obtained in a quantity corresponding to 20% of the initial $B_2O_3$ charged, increasing the overall conversion to 70%.

Example IV

In a process similar to that indicated in Example III above, 6.25 g. of boric oxide, 20 g. of aluminum, 20 g. of anhydrous aluminum chloride, and 10 stainless steel balls are charged to a stainless steel shaker tube. Reaction is carried out for 5 hours at 180–181° C. employing 700–725 atmospheres total hydrogen pressure. The reaction product is bled down normally through liquid nitrogen-cooled traps. There is obtained 19.6 millimoles of product which has a molecular weight of 28 (determined on a gas density balance). The conversion to diborane in this instance amounts to 22% of the boric oxide charged.

Under the above conditions, the solids do not fuse and the residual reactants and products in the tube are in the form of a fine powder.

Example V

In a process as indicated in Example III above, 6.25 g. of boric oxide, 20 g. of aluminum, 22 g. of lithium chloride, 117 g. of anhydrous aluminum chloride, 5 g. of stainless steel powder, and 10 stainless steel balls are charged to a shaker tube. Reaction with hydrogen is carried out at a pressure of 750–780 atmospheres over a period of 5 hours at 178–184° C. There is obtained a 26% conversion of boric oxide to diborane.

Example VI

In a process similar to Example III above, there is charged to a stainless steel shaker tube 20 g. of aluminum powder, 12.5 g. of boric oxide, 34 g. of potassium chloride, 113 g. of anhydrous aluminum chloride and 10 stainless steel balls. Reaction is carried out for 5 hours at 180° C. using 800 atmospheres total hydrogen pressure. Working up the product in the usual manner there is obtained a 12.5% conversion of boric oxide to diborane.

Example VII

A reaction vessel of the type used in Examples I and II is charged with 20 g. of sodium tetraborate (which had been prepared by removing the water of crystallization from borax by heating under vacuum), 20 g. of aluminum powder, 226 g. of aluminum trichloride and 34 g. of potassium chloride. Stainless steel balls are added to insure good mixing. The vessel is evacuated and hydrogen is introduced to produce a pressure of 400 atmospheres. The vessel is then heated to 190° C. and additional hydrogen is introduced to produce a pressure of 800 atmospheres. The reaction vessel is then shaken for 5 hours under these conditions. At the end of this time, the vessel is allowed to cool and the gaseous products are collected in a trap cooled by liquid nitrogen. There is obtained 0.37 g. of a product having a molecular weight of 28.2. Mass spectroscopic analysis proves that this product is 98–100% pure diborane. This represents a 14.8% conversion of sodium tetraborate to diborane.

Example VIII

In a process similar to that described in Example III, 20 g. of aluminum, 30 g. of sodium chloride, 112 g. of anhydrous aluminum chloride, and 12 g. of potassium pentaborate is charged along with 10 stainless steel balls to a stainless steel autoclave which is capable of being shaken. The reaction is carried out at 180° C. and 800 atmospheres total pressure over a period of 5 hours. The product is worked up in the usual manner. There is obtained 14.5 millimoles of diborane which represents a 6.7% conversion of potassium pentaborate to diborane.

Example IX

Into a stainless steel shaker tube is charged 11.1 g. of boric acid, 20 g. of aluminum powder, 30 g. of sodium chloride, 118.4 g. of anhydrous aluminum chloride, and 10 stainless steel balls. This mixture is heated with hydrogen at 700–750 atmospheres and 174–181° C. over a period of 5 hours. The product is worked up in the usual manner. There is obtained 6.2 millimoles of diborane representing a conversion of 7% of boric acid to diborane.

Example X

In a process similar to that indicated above, 6.25 g. of boric oxide, 20 g. of aluminum, 30 g. of sodium chloride, 113 g. of anhydrous aluminum chloride, 10 stainless steel balls and 50 ml. of benzene are charged to a shaker tube. This mixture is treated with hydrogen at 800 atmospheres total pressure and 180° C. over a period of 5 hours. The product is worked up in the manner indicated above. Diborane is obtained in 24% conversion.

The process of this invention possesses the important advantages over the hitherto known methods for making diborane and other boron hydrides of employing the cheapest and most readily available boron compounds as raw materials, and of producing diborane of such a high degree of purity that it does not need purification.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for preparing diborane and higher boron hydrides which comprises reacting, at a temperature of from 100° to 800° C., a member of the group consisting of boric oxide, boric acid and metal borates with hydrogen, aluminum and an aluminum halide in which the halogen is a member of the family consisting of chlorine, bromine and iodine.

2. Process of claim 1 wherein the aluminum is liberated in situ by reaction of a metal more electropositive than aluminum with said aluminum halide.

3. Process of claim 1 in which the aluminum halide is used in admixture with metal halide in which the metal is selected from the group consisting of alkali and alkaline earth metals and in which the halogen has an atomic number of at least 17.

4. Process of claim 1 in which the aluminum halide is used in admixture with metal halide in which the metal is selected from the group consisting of alkali and alkaline earth metals and in which the halogen has an atomic number of at least 17, said aluminum halide-metal halide mixture being characterized by being molten at operating temperature.

5. Process of claim 1 in which the aluminum halide is used in admixture with metal halide in which the metal is selected from the group consisting of alkali and alkaline earth metals and in which the halogen has an atomic number of at least 17, said aluminum halide-metal halide mixture containing at least 50 mole percent of aluminum trihalide.

6. Process for preparing diborane and higher boron hydrides which comprises reacting, at a temperature of from 100° to 800° C., a member of the group consisting of boric oxide, boric acid and metal borates with hydrogen, aluminum and an aluminum halide in which the halogen is a member of the family consisting of chlorine, bromine and iodine, and having up to 2% based on the total weight of the reactants of a catalyst selected from the group consisting of iodine, methyl iodide and mixtures thereof.

7. In a process for making boron hydrides at temperatures below 800° C. by reacting hydrogen and at least one boron-containing compound selected from the group consisting of boric oxide, boric acid, alkali metal borates and alkaline earth metal borates, the step of heating such reactants at temperatures from 100 to 800° C. with aluminum and an aluminum halide in which the halogen is a member of the family consisting of chlorine, bromine and iodine.

8. In a process for making boron hydrides at temperatures below 800° C. by reacting hydrogen and boric oxide, the step of heating such reactants at temperatures from 100 to 800° C. with aluminum and an aluminum halide in which the halogen is a member of the family consisting of chlorine, bromine and iodine.

9. In a process for making diborane at temperatures below 800° C. by reacting hydrogen and boric oxide, the step of heating such reactants from 100 to 800° C. with a mixture of aluminum and an aluminum halide and a member from the class of alkali metal and alkaline earth metal halides in which mixture the halogen is a member of the family consisting of chlorine, bromine and iodine, such mixture containing at least 50 mole percent of aluminum trihalide, said combined reactants containing at least 3 moles of hydrogen, at least 2 gram atoms of aluminum, and at least 1 mole of aluminum halide, respectively, for each mole of boric oxide.

10. In a process for making diborane at temperatures below 800° C. by reacting hydrogen and boric oxide, the step of heating such reactants from 100 to 800° C. with aluminum and an aluminum halide in which the halogen is a member of the family consisting of chlorine, bromine and iodine, said combined reactants containing at least 3 moles of hydrogen, at least 2 gram atoms of aluminum, and at least 1 mole of aluminum halide, respectively, for each mole of boric oxide.

11. The process of claim 10 wherein the reaction is carried out using pressures of from about 0.5 to 3,000 atmospheres.

12. The process of claim 10 wherein the reaction is carried out in a hydrocarbon medium selected from the group consisting of aliphatic, cycloaliphatic and aromatic hydrocarbons using temperatures in the range from 200 to 400° C.

13. The process of claim 10 wherein the reaction is carried out using a catalyst selected from the group consisting of iodine and methyl iodide, said catalyst comprising up to 2% of the total weight of reactants.

14. The process of claim 10 wherein the reaction is carried out continuously at temperatures above 300° C. and the reaction product is removed as formed from the reaction zone and cooled to a temperature below 300° C. in a time of less than one minute.

References Cited in the file of this patent

UNITED STATES PATENTS

| | | |
|---|---|---|
| 2,469,879 | Hurd | May 10, 1943 |
| 2,864,671 | Mohlman | Dec. 16, 1958 |
| 2,888,327 | Adams | May 26, 1959 |
| 2,946,663 | Good | July 26, 1960 |

OTHER REFERENCES

Schechter et al.: "Boron Hydrides and Related Compounds," prepared under Contract NO2(5) 10992 for Dept. of Navy, Bureau of Aeronautics, prepared by Callery Chemical Co., printed March 1951, declassified December 1953, pages 20–23.

Hurd: "Journal of the American Chemical Society," vol. 71, pages 20–22 (January 1949).

Hurd: "Chemistry of the Hydrides," 1952, pages 64–65.

Taylor: "Inorganic and Theoretical Chemistry," 9th edition, 1952, pages 148–49.